US011067442B2

(12) United States Patent
Madi et al.

(10) Patent No.: US 11,067,442 B2
(45) Date of Patent: Jul. 20, 2021

(54) MINIATURIZED WAVEGUIDE IMAGING SPECTROMETER

(71) Applicants: MICOS ENGINEERING GMBH, Dübendorf (CH); EMPA EIDENÖSSISCHE MATERIALPRÜFUNGS- UND FORSCHUNGSANASTALT, Dübendorf (CH)

(72) Inventors: Mohammadreza Madi, Birmenstorf (CH); Edoardo Alberti, Benglen (CH); Ivan Shorubalko, Dubendorf (CH)

(73) Assignees: MICOS ENGINEERING GMBH, Dübendorf (CH); EMPA EIDGENÖSSISCHE MATERIALPRÜFUNGS- UND FORSCHUNGSANSTALT, Dübendorf (CH)

( * ) Notice: Subject to any disclaimer, the term of this patent is extended or adjusted under 35 U.S.C. 154(b) by 148 days.

(21) Appl. No.: 16/317,941

(22) PCT Filed: Jul. 5, 2017

(86) PCT No.: PCT/EP2017/066784
§ 371 (c)(1),
(2) Date: Jan. 15, 2019

(87) PCT Pub. No.: WO2018/011035
PCT Pub. Date: Jan. 18, 2018

(65) Prior Publication Data
US 2019/0219445 A1    Jul. 18, 2019

(30) Foreign Application Priority Data
Jul. 15, 2016 (EP) .................................. 16179718

(51) Int. Cl.
*G01J 3/02* (2006.01)
*G01J 3/453* (2006.01)
(Continued)

(52) U.S. Cl.
CPC ............... *G01J 3/0259* (2013.01); *G01J 3/02* (2013.01); *G01J 3/2803* (2013.01); *G01J 3/4531* (2013.01); *G02B 6/4291* (2013.01)

(58) Field of Classification Search
CPC .............................. G01J 3/0259; G01J 3/2803
See application file for complete search history.

(56) References Cited

U.S. PATENT DOCUMENTS 4,211,911 A *  7/1980  Dehn .................. H05B 6/6447
                                                         219/746
5,764,820 A     6/1998  DeDobbelaere
(Continued)

FOREIGN PATENT DOCUMENTS

CN    1094817 A    11/1994
CN    1107618 A    8/1995
(Continued)

OTHER PUBLICATIONS

Eva Ryckeboer, "CMOS-compatible silicon nitride spectrometers for lab-on-a-chip spectral sensing", May 13, 2016 (Year: 2016).*
(Continued)

*Primary Examiner* — Maurice C Smith
(74) *Attorney, Agent, or Firm* — Paul D. Bianco; Gary S. Winer; Fleit Intellectual Property Law

(57) ABSTRACT

A waveguide spectrometer includes at least one substrate layer with at least one waveguide. Each waveguide extends from an inlet face proceeding partly through the substrate layer to a reflecting element. A multiplicity of photo detectors is arranged on a front side of the substrate layer, while the photo detectors are electrically connected to an elec-
(Continued)

tronic read out system. The spectrometer can be made lightweight and easier to produce by forming the waveguides as surface waveguides, each showing a longitudinal opening with a width to the front side of the substrate layer between the inlet face and the reflecting element. The photo detectors are in print distributed at the front side on top of the substrate layer at least partly overlapping the longitudinal opening along an overall length of sampled region and the electrical connection of the photo detectors with the electronic read out system is achieved by a multiplicity of printed electrical conductors.

20 Claims, 3 Drawing Sheets

(51) Int. Cl.
G01J 3/28 (2006.01)
G02B 6/42 (2006.01)

(56) References Cited

U.S. PATENT DOCUMENTS

| | | | | |
|---|---|---|---|---|
| 6,300,638 | B1 * | 10/2001 | Groger | G01N 21/648 250/458.1 |
| 6,743,581 | B1 * | 6/2004 | Vo-Dinh | G01N 33/54373 506/39 |
| 7,233,711 | B1 * | 6/2007 | Beausoleil | G01N 21/648 385/12 |
| 7,444,045 | B2 | 10/2008 | Fan et al. | |
| 7,532,784 | B2 | 5/2009 | Tolshikhin et al. | |
| 7,812,958 | B2 | 10/2010 | Le Coarer et al. | |
| 2008/0007541 | A1 * | 1/2008 | Eliasson | H03K 17/9638 345/176 |
| 2010/0090234 | A1 | 4/2010 | Cho et al. | |
| 2015/0116720 | A1 * | 4/2015 | Hadjar | G01J 3/0205 356/451 |
| 2018/0106671 | A1 | 4/2018 | Claes | |
| 2020/0278248 | A1 | 9/2020 | Guldimann | |

FOREIGN PATENT DOCUMENTS

| | | |
|---|---|---|
| CN | 1867844 A | 11/2006 |
| CN | 101529292 A | 9/2009 |
| EP | 1825312 A1 | 8/2007 |
| WO | 2016/025727 A2 | 2/2016 |
| WO | 2018/11023 A1 | 1/2018 |

OTHER PUBLICATIONS

Hyundai Park, "A hybrid AlGaInAs-silicon evanescent preamplifier and photodetector", 2007 (Year: 2007).*
Rongjin Yan, "Immunoassay demonstration using a local evanescent array coupled biosensor", 2010 (Year: 2010).*
Donghwan Ahn, & "Evanescent Coupling Device Design for Waveguide-Integrated Group IV Photodetectors", 2010 (Year: 2010).*
Zgraggen, "Optical properties of waveguide-coupled nanowires for sub-wavelength detection in microspectrometer applications", 2015 (Year: 2015).*
International Preliminary Report on Patentability and Written Opinion for PCT/EP2017/066671 filed Jul. 4, 2017 (English translation).
English translation of International Preliminary Report on Patentability dated Jan. 15, 2019 and Written Opinion for PCT/EP2017/066784 filed Jul. 5, 2017.
International Search Report dated Aug. 28, 2017 for PCT/EP2017/066784 filed Jul. 5, 2017.
Written Opinion for PCT/EP2017/066784 filed Jul. 5, 2017.
Guldimann Benedikt et al: "Focal plane array spectrometer: miniaturization effort for space optical instruments", MOEMS and Miniaturized Systems X, SPIE, vol. 7930, No. 1, Feb. 10, 2011, 14 pages.
Etienne Le Coarer et al: "Wavelength-scale stationary-wave integrated Fourier-transform spectrometry", Nature Photonics, vol. 1, No. 8, Aug. 1, 2007, pp. 473-478
International Search Report dated Oct. 19, 2017 for PCT/EP2017/066671 filed Apr. 7, 2017.
Written Opinion for PCT/EP2017/066671 filed Apr. 7, 2017.
M Pierre Benech et al: "Professeur des universités à Grenoble-INP PHELMA, Examinateur",Nov. 18, 2014 (Nov. 18, 2014), XP055336099, 226 pages.
Jerome Ferrand: "Étude et réalisation d'un spectromètre intégré à transformée de Fourier (SWIFTS)", 2010 XP055336339 Retrieved from the Internet: URL: https://tel/archives-ouvertes.fr/tel-00554948/file/Jerome_Ferrand_these_A4.pdf.
Thomas F et al: "First Results in Near and Mid IR Lithium Niobate-Based Integrated Optics Interferometer Based on SWIFTS—Lippmann Concept", Journal of Lightwave Technology, IEEE Service Center, New York, NY, US, vol. 32, No. 22, Nov. 15, 2014(Nov. 15, 2014), pp. 3736-3742.
R. Osellame et al: "Femtosecond laser microstructuring: an enabling tool for optofluidic lab-on-chips", Laser & Photonics Reviews, vol. 5, No. 3, May 2, 2011 (May 2, 2011), pp. 442-463.
Office action (with English translation) (dated Aug. 28, 2020) and search report (dated Aug. 20, 2020) for Chinese Patent Application No. 2017800568651.
Office Action dated Dec. 22, 2020 for U.S. Appl. No. 16/317,969.

* cited by examiner

MINIATURIZED WAVEGUIDE IMAGING SPECTROMETER

TECHNICAL FIELD

The present invention describes a waveguide imaging spectrometer, comprising at least one substrate layer with at least one waveguide, each waveguide is extending from an inlet face proceeding partly through the substrate layer to a reflecting element, wherein a multiplicity of photo detectors is arranged on a front side of the substrate layer, allowing out-coupling of evanescent fields from each waveguide at the positions of the photo detectors, while the photo detectors are applicable as evanescent field samplers each electrically connected to an electronic read out system and a method for manufacturing of such waveguide spectrometer.

STATE OF THE ART

Spectroscopy is a general physical-analysis approach for investigating light-matter interactions. Current trends in the actual generation of imaging spectrometers are evidencing bifurcation path; from one side, with the increasing interest in the dedicated spectral regions for generating targeted products; and from the other side, with the growing interest in large spectral regions for general advance scientific purposes.

The development effort for new generation of instruments, which satisfies the increased demand in accuracy, is notable. The upcoming systems are expected to have larger time coverage, more refined spatial resolution, and better radiometric performance. Additionally, miniaturization of the systems is highly demanded for all applications where mass, volume and consumed power are drivers for costs or application capability. Miniaturization of spectrometer systems is a milestone envisioned in the next 10-15 years, reducing mission/project costs in space borne applications, maximizing recurrent costs and allowing integration in micro-satellites for strategic missions. For space borne applications, a compact integrated spectrometer has a direct impact on the payload of the instrument. Moreover, monolithic integrated systems will reduce alignment requirements during integration and enhance stability during the instrument lifetime [P. Kern, "On-chip spectro-detection for fully integrated coherent beam combiners.," Opt. Express 17 (2009), pp. 1976-1987, 2009]. Spectroscopy from UV to IR with various and numerous instruments, already exist. Applications are dominated in many fields by single-pixel detector instruments. On the other hand, imaging spectrometers with contiguous bands and narrow spectral resolution (also branded commercially as "hyperspectral imagers) are used specifically for the purpose of measuring the spectral content of collected radiation, covering the imaging aspect of the spectral measurement. Dominating technology for imaging spectrometers covering spectral ranges between UV to SWIR for the time being are the dispersive instruments in push-broom mode. Imaging FTS systems are commercially operative mostly in the IR region and first instrumentation (MTG-IRS instrument) is expected to become operational by 2018. However, it is important to mention that all these instruments, despite their high capabilities, are rather large and mass demanding. For example, imaging spectrometers intended for very wide spectral ranges are best in terms of accuracy, if they are designed based on all-mirror systems. This in turn leads to large, very massive, complex, and costly systems.

Investigation on miniaturized spectrometric devices is a worldwide effort actually, covered by a number of different approaches with ongoing studies at different research institutions. A NASA Goddard team [L. Keesey, "NASA's Goddard Space Flight Center, Greenbelt, Md.," 2012., http://www.nasa.gov/topics/technology/features/chip-spectrometer.html] for instance is working to demonstrate Miniaturized Spectrometer-on-a-Chip which, like the Composite Infrared Spectrometer (CIRS) on the board of Cassini Mission 1997, would be sensitive to mid-infrared bands.

The potential device is a greatly scaled down version of a Michelson-type FTS commonly used to study the spectra of planets and stars and identify their chemical makeup and other physical properties. To give an idea of the compactness of the new generation of FTS, it is enough to say that CIRS on the board of Cassini spacecraft is as big as a dishwashing machine, in spite the fact that it is powerful and has valuable discoveries. However, the discussed device under study at NASA Goddard would be capable of a measuring only a single pixel and its concept cannot be made upgradable to evolve into an imaging spectrometer.

The Technical University of Delft has investigated compact spectrometer configurations based on a dispersive principle, performing in the VIS NIR range and based on a single aluminum-coated glass wafer. They are acting as push-broom spectrometer but limited with respect to the market requests, limited spectral resolution. Companies as Imec (Heverlee, Belgium) started to commercialize a snapshot imaging spectrometer characterized by Fabry Perot filters arrays in front of the pixels of an imaging sensor. They are characterized by a rather large spectral FWHM (in the range of 5 to 15 nm). More over this method is only applicable to push-broom spectrometer and to snapshot spectrometers applying processing techniques to artificially reconstruct the spectrum for each pixel and is currently limited to VIS NIR applications.

Taking advantage of photonics and near-field optics, Le Coarer et al. [E. Le Coarer, "Wavelength-scale stationary-wave integrated Fourier-transform spectrometry," Nature Photonics 1.8, pp. 473-478, 2007] in 2007 introduced a kind of Stationary-Wave Integrated Fourier-Transform Spectrometry (SWIFTS), in which direct sampling of evanescent standing waves is achieved using a collection of optical nanoprobes according to EP1825312.

In the SWIFTS™ linear configuration, the stationary wave is created by a single-mode waveguide ended by a fixed mirror. The energy extraction required to sample the standing wave is obtained by sampling the evanescent wave on one side of the waveguide using nano-scattering dots located in the evanescent field. These nanodots, which are characterized by an optical index difference with the medium in which the evanescent field is located, scatter the light around an axis perpendicular to that of propagation within the waveguide. For each nano-dot, the scattered light is detected by a pixel aligned with this axis. The intensity detected is thus proportional to the intensity of the waveguide at the exact location of the nano-dot. A mathematical function known as a Lippmann transform—which is similar to a Fourier transform—takes into account all the calibration data and, when applied to the linear image, gives the spectrum of the light. In these configurations, the back reflecting element (a mirror) is fixed and no scanning possibility is introduced. Due to this, the commercialized SWIFTS spectrometer can be used in applications where signals have significantly long coherence length, for example for measuring unstable laser sources, fast characterization of multimode laser, and high-speed wavelength tuning of laser. However, there is still a significant discrepancy between these commercialized SWIFTS products and a proper miniaturized product for space/commercial applications. Another drawback of this configuration is that the inherent configuration allows to analyze spectral range of bandwidth limited by the Nyquist principle (generally 5 to 10 nm).

In the recent years, breakthrough core technologies applicable to spectroscopy have been published. In 2010, based on Lippmann and Gabor standing waves in waveguides a novel concept for spectroscopy, called "focal plane array spectrometer (FPAS)" has been introduced [G. B. and K. S., "Focal Plane Array Spectrometer: miniaturization effort for space optical instruments," Proc. of SPIE, vol. Vol 7930, pp. 01-14, 2010]. The FPAS is a wideband imaging implementation of a stationary-wave integrated Fourier-transform spectrometer, targeting space borne applications. The advantage of FPAS over previous implementations is that, it allows to perform Fourier transform spectroscopy within an extremely small volume and to expand the recollected spectral range of interest by means of an interferogram scanning principle. The FPAS, a highly integrated instrument concept, is based on a bi-dimensional array of waveguides, in which the light is injected at one bound. In each waveguide, the injected light in one end of the waveguide, is propagating along it, and is reflected by a mirror on the other bound of the waveguide. This generates a stationary (or standing wave) interference pattern. This standing wave pattern is sampled by means of evanescent field samplers, which are geometrically fixed on the waveguides and detectors. Like in a Fourier Transform Spectrometer, the spectral content of an observed scene is generating a specific interference pattern in the standing wave, called the interferogram. In order to sample the interferogram, light is outcoupled on the top of the waveguide at distinct positions. The interferogram pattern (which is generated by the forward and backward propagating light in the waveguide) sampled by the evanescent field samplers, is directed (e.g. by an image transfer optics) to the pixels of a matrix detector. In order to firstly expand the spectral bandwidth of the recollected spectrum and in order to collect the interferogram collection within the coherence length of the signal, a scanning mirror is adopted. The matrix detector transfers the collected light to electrical signal, and sends it to a processing unit (DSP or FPGA). Such a FPAS spectrometer may be assembled in small size, and form a compact package of single spectrometers. When this system is positioned in the focal plane of an objective, it will allow imaging spectrometry of the observed surface (objects).

FPAS is indeed a miniaturization concept for imaging spectrometers. However, its performance is specifically limited by the interferogram samplers which are geometrically fixed on the waveguides. The samplers cannot be placed at a spatial distance required by Nyquist criterion, otherwise the sub-micron distance between them would cause crosstalk between extracted data. The crosstalk is caused by retro reflections of guided modes and their propagation in the waveguide. Apart from that, the common detecting techniques require either bulky optics for gathering sampled data from samplers or sophisticated electronics.

In summary, the disadvantage of the state of the art is that individual waveguide manufactory technique using common lithography techniques makes assembly very sophisticated, on the other hand the detecting technique including image transfer optics and detector matrix are very space consuming and not adequate for stacking the pixels.

DESCRIPTION OF THE INVENTION

The object of the present invention is a lightweight simply producible and highly compact waveguide imaging spectrometer comprising waveguides with corresponding detector arrays.

Another object of the invention is a simplified manufacturing technique of waveguide spectrometer, which are stackable in a very tiny volume.

A solution is presented for realizing compact waveguide imaging spectrometer including surface waveguides written into a substrate, integrated with thin detector-array manufactured directly on the surface of the waveguides.

BRIEF DESCRIPTION OF THE DRAWINGS

A preferred exemplary embodiment of the subject matter of the invention is described below in conjunction with the attached drawings.

DESCRIPTION

Figure 1:
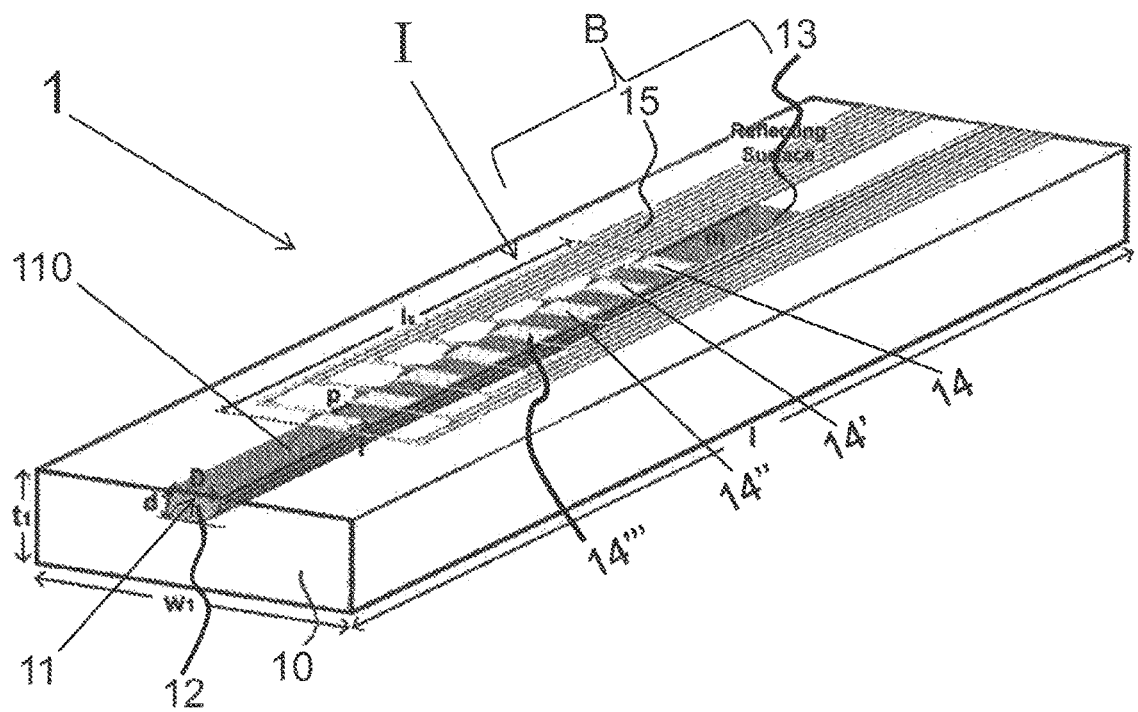
FIG. 1 shows a perspective image of single pixel waveguide spectrometer including a substrate, an inscribed waveguide, graphene photo-detectors, metallic conductors and reflecting surface.
Figure 2:
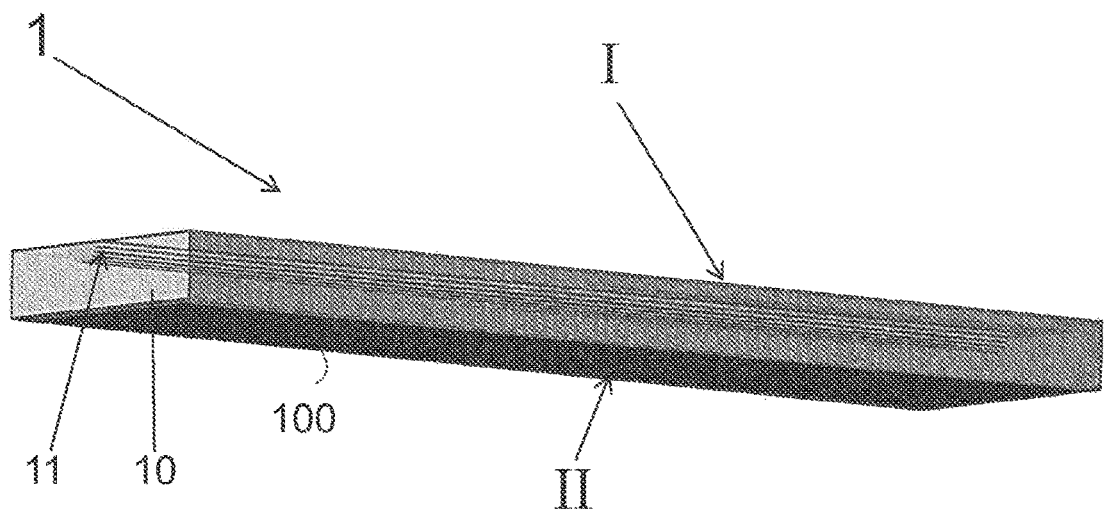
FIG. 2 shows a perspective bottom view of a substrate with light-absorbing coating on the bottom of the substrate containing waveguide.

FIG. 1 shows a waveguide spectrometer 1, comprising one substrate layer 10 with one surface waveguide 11. The surface waveguide 11 is extending from an inlet face 12 proceeding partly through the substrate layer 10 to a reflecting element 13. In the area of the inscribed surface waveguide 11, the refractive index is changed and differs from the not laser radiated substrate material. Presented in FIG. 1 is a single pixel waveguide spectrometer 1, comprising one substrate layer 10 and one surface waveguide 11. Each surface waveguide 11 shows a longitudinal opening 110 to a front side I of the substrate layer 10 with width D. The longitudinal opening 110 shows a planar surface at the front side I. The surface waveguides 11 are inscribed directly in the substrate layer 10, aiming monomode wave propagation at designed wavelength.

The substrate layer 10 shows a substrate length l, a substrate width w1 and a substrate height t1, while in the middle of the front side I surface the surface waveguide 11 is extending in direction of the substrate length l, partly reaching through the substrate layer 10 to the reflecting element 13.

A multiplicity of photo detectors 14, 14', 14", 14''' is connected to a multiplicity of conductors 15, arranged at least partly along the at least one surface waveguide 11 on the front side I of the substrate layer 10. The conductors 15 are printed on the surface of the front side I for electrically connection of the photo detectors 14, 14', 14", 14'''. The in particular metallic conductors 15 transfer the electric signal to the electronic read-out which is placed at the back side B of the photo detector 14 array, which faces away from the inlet face 12 side of the substrate layer 10.

The photo detectors 14 are distributed on the front side I of the substrate layer 10, at least partly bridging or overlapping the longitudinal opening 110 of the surface waveguide 11. Here eight equal distanced photo detectors 14 are exemplary shown, but the numbers could vary. Each photodetector 14 has a width f protruding in direction of the substrate length l and a distance p between adjacent detectors 14. The first photo detector 14 (or first sampler) of the array of photo detectors 14, 14', 14", 14''' is distanced to the reflecting element 13 with reflecting surface with a distance m.

We introduced carbon based nano-structures, in particular graphene as material for photo detectors 14, 14', 14", 14'''. The photo detectors 14, 14', 14", 14''' are forming sheets, with at least one graphene layer, comprising the known two-dimensional monolayer of carbon. The graphene monolayers can be combined with quantum-dots (nanodots) for increasing the light sensitivity of graphene detector The graphene-based photodetector 14 arrays work based on photo-effect in graphene. The width of the graphene channel f is derived from the guide-wavelength e.g. @1550 nm the width of graphene channel f is smaller than 85 nm for proper sampling of a standing wave whose guide-wavelength is around 350 nm.

The distance between adjacent photo detectors 14 (graphene channels or sampler) p defines the bandwidth of the spectrometer. The overall length of sampled region ls defines the spectral resolution of the spectrometer.

The distance m between reflecting element 13 respectively reflecting surface 13 and the first photo detector or sampler 14 is minimized since main energy is stored closer to the refracting surface at Zero Path Difference (ZPD) in broadband applications.

Depending on the spectral range of interest, proper transparent substrate materials are used. For instance, for applications from Visible to Mid-wavelength infrared (MWRI, 4 μm), Lithium Niobate material can be used for substrate layer 10 material or at Visible/NIR borosilicate glass can be used as substrate layer 10 material, in which the surface waveguides 11 are to be introduced.

The maximal depth d and the width D of surface waveguides 11 are defined by wavelength of operation and the technique used for inscribing waveguides 11 i.e. single core waveguides 11 produced by local change of refractive index along the substrate for visible to NIR applications or surface cladding waveguides 11 by producing number of parallel damage tracks with lateral separations in the substrate layer 10 for applications in shortwave infrared (SWIR) and Mid-wavelength infrared (MWIR).

For instance, at 1550 nm, a femto-second pulse laser written surface cladding waveguide 11 with diameter smaller than 30 μm is required for optimum monomode propagation in LiNbO3 crystal. The depth d of waveguide 11 is optimized in order to have access to evanescent field on the top surface of the front side I of the substrate layer 10.

The reflecting element 13 acting as a back-reflecting mirror can be machined as close as possible to the first graphene channel 14 using e.g. focused ion beam (FIB) milling technique filled by a reflective material at the designed wavelength.

To prevent signal interference, in particular while stacking substrate layers 10 with surface waveguides 11 in two or three d arrays, on a back side II of the substrate layer 10 a light absorbing coating 100 is applied. This light absorbing coating 100 used are based on carbon or carbon nanotubes, for example super black materials or known black paints could be used.

Figure 3:
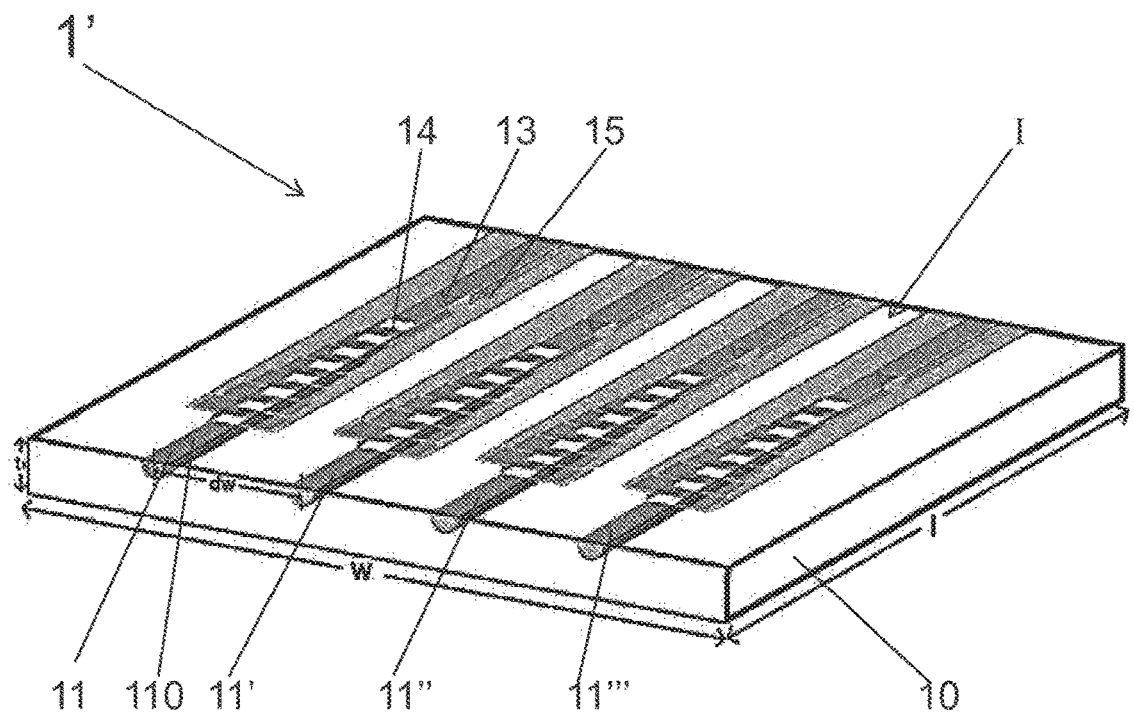
FIG. 3 shows a perspective view of a waveguide imaging spectrometer with a waveguide array of 4 pixels in a single substrate setup (1D).

FIG. 3 shows one substrate layer 10 with four independent surface waveguides 11, 11', 11", 11''' introduced. The spectrometer 1' (waveguide array of 4 pixels in a single substrate setup (1D)) comprises a row of surface waveguides 11 in one substrate layer 10.

Each longitudinal opening 110 of each surface waveguide 11 is furnished with an array of photo detectors 14 with associated conductors 15. The distance in direction of the substrate layer 10 width w between adjacent surface waveguides 11 is dw. The single pixel setup shown in FIG. 1 is repeated in the substrate layer 10. The distance between pixels dw is defined based on the space required for electronic read-out and metallic conductors 15 (from few μm to some mm).

Figure 4:
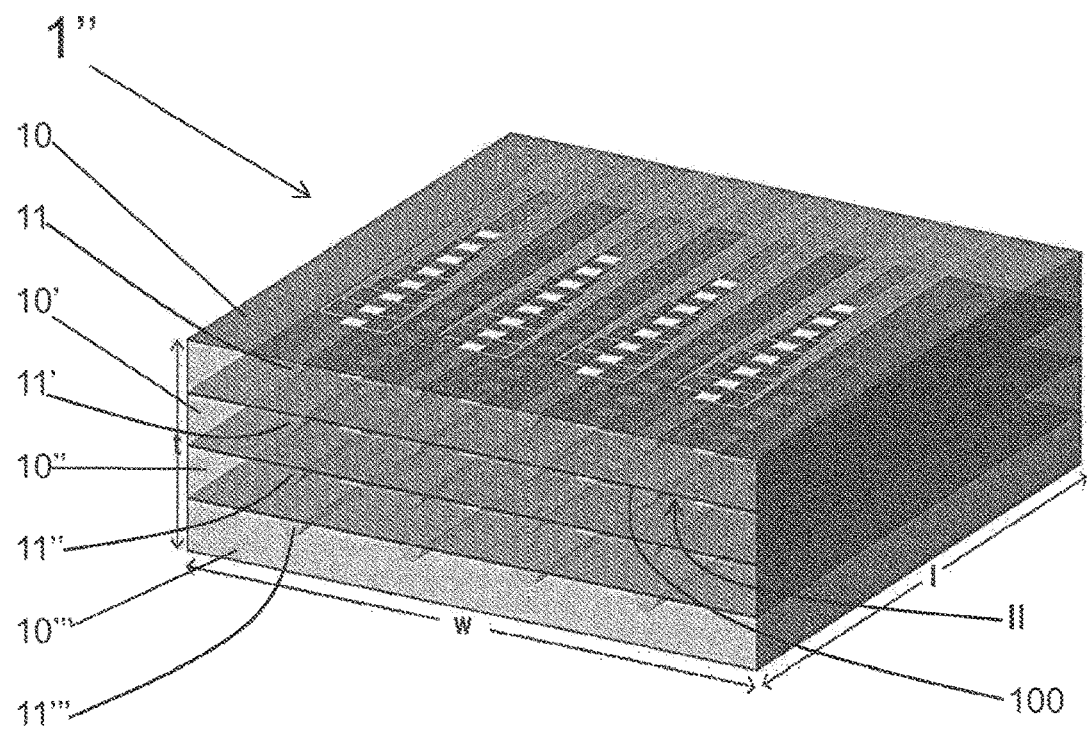
FIG. 4 shows a perspective view of a waveguide imaging spectrometer in form of a stack of four waveguide spectrometers with waveguide arrays of 4 pixels each in a single substrate setup with a sub-array of 4×4 Pixels in a compact Imaging Spectrometer configuration (2D).
Figure 5:
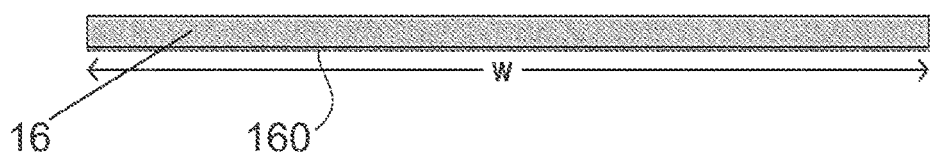
FIG. 5 Front-side view of the intermediate substrate layer and the anti-reflective coating on its bottom-side.

As depicted in FIG. 4, building of a spectrometer stack 1", comprising a multiplicity of substrate layer 10, 10', 10", 10''', each comprising a multiplicity of surface waveguides 11, 11', 11", 11''' and light absorbing coating 100 at least on the back side II of intermediate substrate layer 10, 10', 10" is possible. The stack 1" shows a height t and a stack width W. The substrate layers are bonded or glued. Bonding can be achieved by optimizing the absorbing coating to include this function, by an additional thin adhesive layer or externally by adding an external fixation means.

Figure 6:
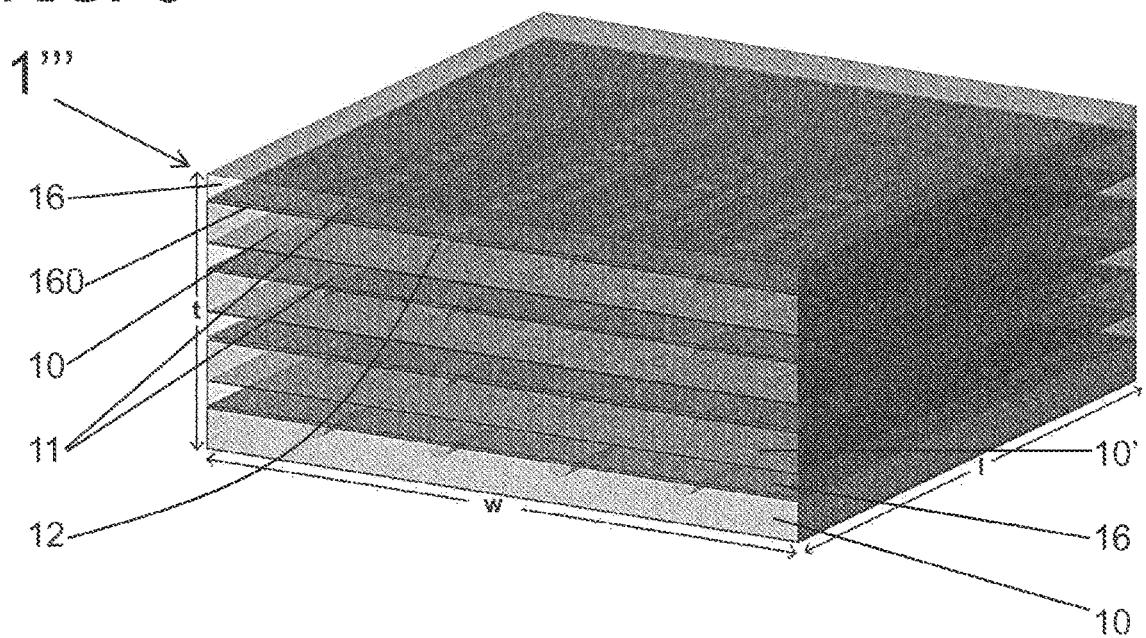
FIG. 6 Sub-Array of 4×4 Pixels in a compact Imaging Spectrometer configuration including intermediate substrates, anti-reflective (dark back on the bottom of substrate with waveguides) and absorbing layers.

For further improvement of waveguide spectrometer 1''', an intermediate substrate layer 16, similar to the substrate layer 10 material within which waveguides 11 are inscribed, is placed on the front side I of each substrate layer 10 with surface waveguides 11 to prevent distortion of guided wave and cross-talk with the next upper substrate layer 10' when stacked. The thickness of intermediate substrate layer 16 should be smaller than the thickness t1 of the substrate layer 10. Such a waveguide spectrometer in form of the stack 1''' is depicted in FIG. 6 in a perspective view from the side of the inlet faces 12 of the surface waveguides 11.

The bottom part of the intermediate substrate layer 16 is coated by an anti-reflective coating 160 of an anti-reflective material.

Figure 7:
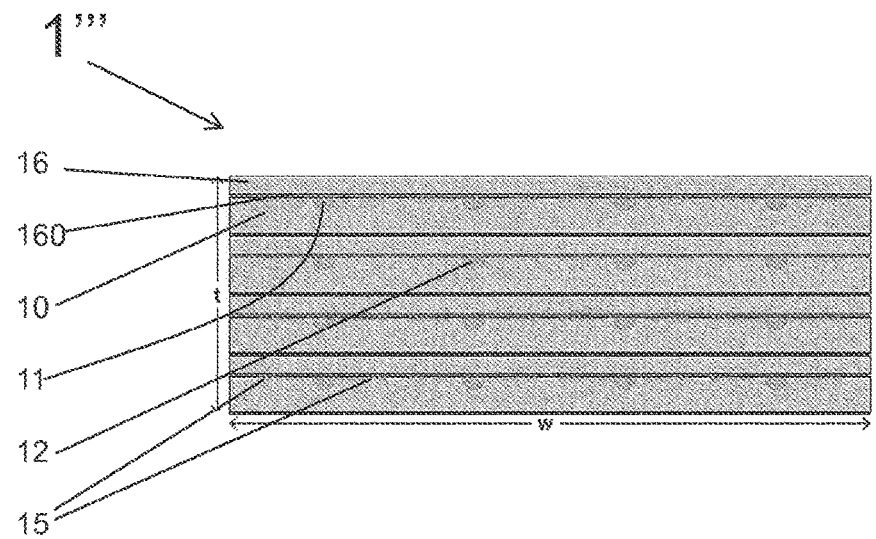
FIG. 7 shows a back-side view of the imaging spectrometer according to FIG. 6, showing the conductors reaching towards an electronic read-out including intermediate substrates, anti-reflective (dark back on the bottom of substrate with waveguides) and absorbing layers (on the bottom of intermediate substrate layer).

In the side view of the stack 1''' in FIG. 7, it is shown, that the conductors 15 are reaching to the end face of the substrate layers 10 and therewith to the end face of the stack 1''', where the conductors 15 are connected to an electronic read out system.

Due to the fact, that the conductors 15 of all presented waveguide spectrometer 1, 1', 1", 1''' are reaching to the end face of the substrate layer 10, 10', 10", 10''', the electrical connection of the conductors 15 with the electronic read out system, can be easily and directly done.

We introduce two innovative solutions towards highly compact waveguide imaging spectrometer 1. The first aspect improves the manufacturing process of the substrate layer 10 with surface waveguides 11 and stacks thereof so to achieve a pushbroom configuration in a cost effective way.

This includes inscribing the waveguides 11 directly within the cladding substrate e.g. femto-second laser pulse waveguide manufacturing techniques.

In a large manufacturing scale, this configuration provides a robust, and cost-effective solution with direct access to evanescent fields on the smooth surface of the substrate required for deposition of sampling structures and detector matrix.

The second aspect concerns the direct fabrication of opto-electrical detector arrays on the surface of the substrate for direct detection of the evanescent waves by transforming photons to a signal that is then used for retrieving the spectral information. This is now feasible thanks to the innovative waveguide manufacturing technique which provides a smooth wide surface on the top of the waveguides 11 at the front side I of the substrate layer 10.

The detectors 14, e.g. arrays of graphene nano-detectors 14, are printed directly on the front side I of the substrate layer 10, directly in touch with the evanescent fields of propagating mode in the waveguide 11. The great advantage in this method is that there is no need for any image transfer optics for collecting signals extracted by evanescent field samplers; data is locally transformed into electric signal for data treatment.

After inscription of the at least one surface waveguide 11 in the substrate layer 10 with a laser beam in direction of the length l of the substrate layer 10 the reflecting element 13 is directly placed onto or into the surface waveguide 11, before the multiplicity of photo detectors 14 and electrical conductors 15 are printed onto the front side I of the substrate layer 10.

These new techniques pave the way towards cost effective manufacturing of the stacked structures needed in the development of the hyperspectral (2D) sensor, which will represent the major breakthrough expected.

In comparison to SWIFTS technology which provides a single-pixel solution, the device introduced here is an array of pixels in a push-broom configuration. On the other hand, due to the absence of image transfer optics and common detector matrix (CCS, CMOS, . . . ) which are proposed in the state of the art, this new device is stackable in a very tiny volume.

Optional the reflecting element 13 can be configured to be movable in the longitudinal opening 110 of the surface waveguide 11 in order to modify the propagation properties of the reflected counter propagating optical signal and thereby modify the generated interference pattern. The movable reflecting element 13 can be manufactured to be a MEMS (micro electro-mechanical system) structure directly etched or milled into waveguide and electrostatically moved, such as other MEMS structures today.

LIST OF REFERENCE NUMERALS 1 waveguide spectrometer
1' spectrometer with a row of waveguides in one substrate layer
1" spectrometer with stack of several substrate layer
1'" spectrometer with stack with several substrate layer/ intermediate substrate layer
10 Substrate layer
  I front side
  II back side/absorbing side
  100 Light absorbing coating
  l substrate length
  w1 substrate width
  t1 substrate height
11 surface waveguides
  110 longitudinal opening
  d maximal depth
  D width
  ls overall length of sampled region
  m distance between reflecting surface and the first sampler/photo detector
  dw distance between neighboured waveguides in direction of substrate width
12 inlet face
13 reflecting element with reflecting surface
14 photo detector/graphene channel
  f width of the graphene channel
  p distance between adjacent graphene channels
  B back side of photo detector array
15 conductors (metallic)
16 Intermediate substrate layer
  160 Anti-reflective coating

The invention claimed is:

1. A waveguide spectrometer comprising:
at least one substrate layer with a plurality of waveguides, each of the waveguides extending from an inlet face proceeding partly through the substrate layer to a reflecting element,
wherein a plurality of photo detectors is arranged on a front side of the substrate layer, allowing out-coupling of evanescent fields from each of the waveguides at positions of the photo detectors, while the photo detectors are applicable as evanescent field samplers, each electrically connected to an electronic read out system,
the waveguides are surface waveguides, each comprising a longitudinal opening with a width in the front side of the substrate layer between the inlet face and the reflecting element,
while the photo detectors are in print distributed at the front side on top of the substrate layer at least partly overlapping the longitudinal opening of the surface waveguide along an overall length of sampled region, and
electrical connection of the photo detectors with the electronic read out system is achieved by a plurality of printed electrical conductors.

2. The waveguide spectrometer according to claim 1, wherein the conductors are protruding along the front side of the substrate layer reaching the end face of the substrate layer.

3. The waveguide spectrometer according to claim 1, wherein the photo detectors are of sheetlike nature, with a thickness of at least one monolayer of material.

4. The waveguide spectrometer according to claim 3, wherein the photo detectors comprise printable carbon based nano-structures.

5. The waveguide spectrometer according to claim 1, wherein the substrate layer comprises $LiNbO_3$ or borosilicate glass.

6. The waveguide spectrometer according to claim 1, wherein each of the surface waveguides is directly inscribed into the substrate layer.

7. The waveguide spectrometer according to claim 1, wherein a light absorbing coating is applied on a back side of the substrate layer.

8. The waveguide spectrometer according to claim 1, wherein an intermediate substrate layer comprising an anti-reflective coating on a back side is fixed with the front side of the substrate layer.

9. The waveguide spectrometer according to claim 1, wherein the plurality of surface waveguides are arranged in a row in one substrate layer, each of the surface waveguides showing a longitudinal opening to the front side of the substrate layer between the inlet face and the reflecting element, while the photo detectors are distributed at the front side on top of the substrate layer at least partly bridging the longitudinal openings of the surface waveguides.

10. The waveguide spectrometer according to claim 1, wherein a plurality of n substrate layers, each comprising a plurality of the surface waveguides, are stacked by connection of the back sides of n−1 substrate layers with the front sides of n−1 adjacent substrate layers, building a stack with the plurality of substrate layers.

11. The waveguide spectrometer according to claim 10, wherein in the stack, the front side of each of the of substrate layers is connected to an intermediate substrate layer.

12. The waveguide spectrometer according to claim 1, wherein the reflecting element comprises a mirror.

13. The waveguide spectrometer according to claim 1, wherein the substrate layer comprises $LiNbO_3$.

14. The waveguide spectrometer according to claim 1,
wherein a plurality of n substrate layers, each comprising a plurality of the surface waveguides, are stacked,
the front side of each of the of substrate layers is connected to an intermediate substrate layer, and
in the stack, the back side of each substrate layer above the first substrate layer is connected with the intermediate substrate layer that is connected to the front side of the adjacent substrate layer.

15. A method for manufacturing a waveguide spectrometer comprising at least one substrate layer with at least one waveguide, each of the at least one waveguides extending from an inlet face proceeding partly through the substrate layer to a reflecting element, wherein a plurality of photo detectors is arranged on a front side of the substrate layer, allowing out-coupling of evanescent fields from each of the at least one waveguides at positions of the photo detectors, while the photo detectors are applicable as evanescent field samplers, each electrically connected to an electronic read out system, wherein each of the at least one waveguides is a surface waveguide, each comprising a longitudinal opening with a width in the front side of the substrate layer between the inlet face and the reflecting element, while the photo detectors are in print distributed at the front side on top of the substrate layer at least partly overlapping the longitudinal opening of the at least one waveguide along an overall length of sampled region, and electrical connection of the photo detectors with the electronic read out system is achieved by a plurality of printed electrical conductors, said method comprising the steps of:
inscribing the at least one surface waveguide in the substrate layer with a laser beam in direction of the length of the substrate layer,
placing the reflecting element directly onto or into the at least one surface waveguide, before
directly printing the plurality of photo detectors and electrical conductors onto the front side of the substrate layer.

16. The method according to claim 15, wherein the reflecting element is placed by lithographic or milling technique into the at least one surface waveguide, resulting in a reflecting surface at or near the milled location.

17. The method according to claim 15, wherein the inscription of the at least one surface waveguide is done with femtosecond laser pulses.

18. The method according to claim 15, wherein after the inscription of the substrate layer with at least one surface waveguide, the placement of the reflecting element and the printing of the plurality of photo detectors and electrical conductors, a stack is built by repetition of these steps.

19. A waveguide spectrometer comprising:
a substrate layer with at least one waveguide, each of the at least one waveguides extending from an inlet face proceeding within the substrate layer to a mirror,
wherein each of the at least one waveguides is a surface waveguide, comprising a longitudinal opening with a width D and a maximal depth d in a front side of the substrate layer between the inlet face and the mirror,
a plurality of photo detectors is arranged on the front side of the substrate layer, allowing out-coupling of evanescent fields from each of the at least one waveguides at positions of the photo detectors, while the photo detectors are applicable as evanescent field samplers, each for electrical connection to an electronic read out system,
the photo detectors are distributed on top of the front side of the substrate layer at least partly overlapping the longitudinal opening of the at least one surface waveguide, and
a plurality of printed electrical conductors are provided for electrical connection of the photo detectors to the electronic read out system.

20. The waveguide spectrometer according to claim 19, wherein the longitudinal opening of the at least one surface waveguide shows a planar surface at the front side of the substrate layer.

* * * * *